I. N. DAWSON.
GATE.
APPLICATION FILED FEB. 1, 1913.
1,092,901.
Patented Apr. 14, 1914.
3 SHEETS—SHEET 1.
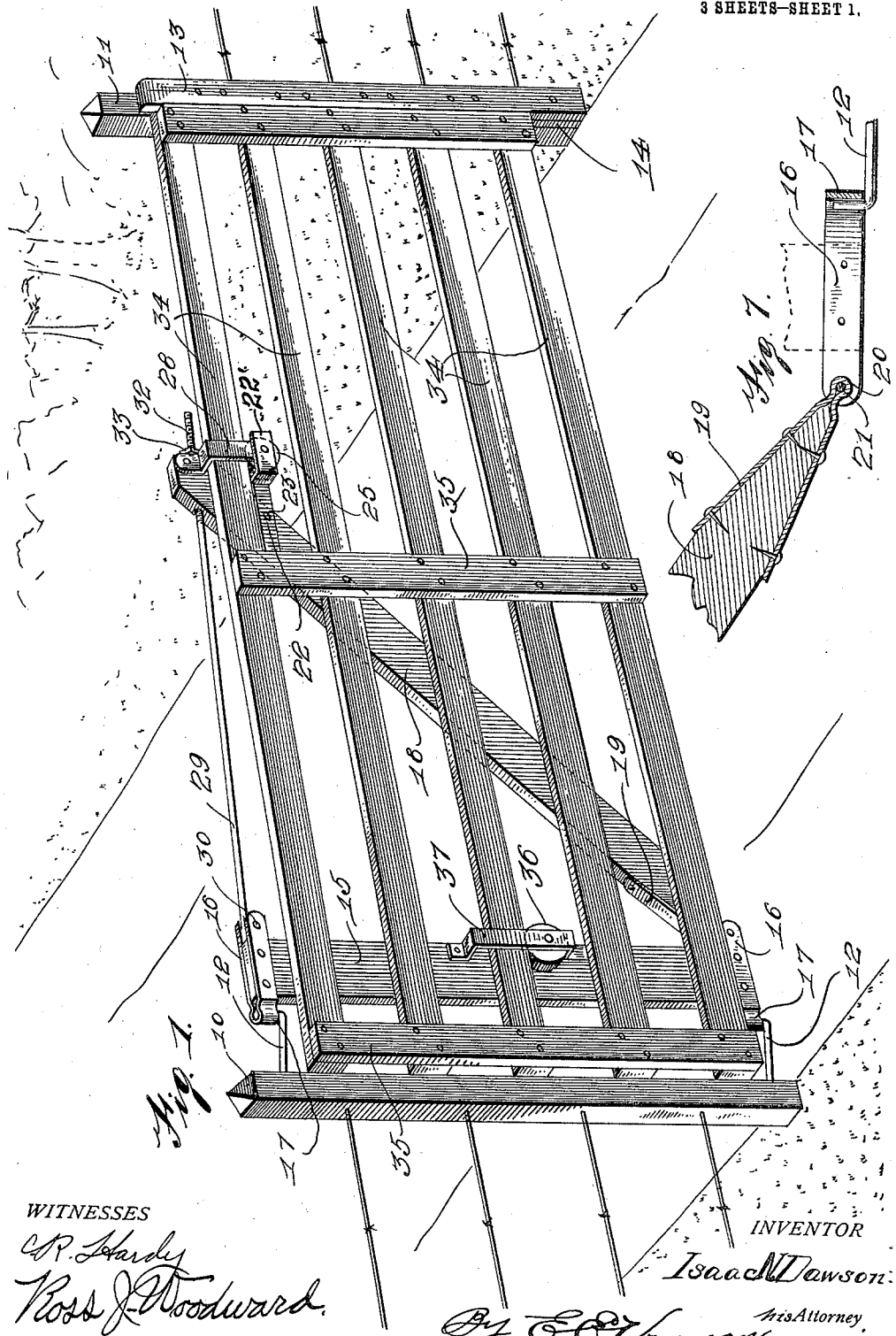
WITNESSES
INVENTOR
Isaac N. Dawson
By E. E. Vrooman, his Attorney

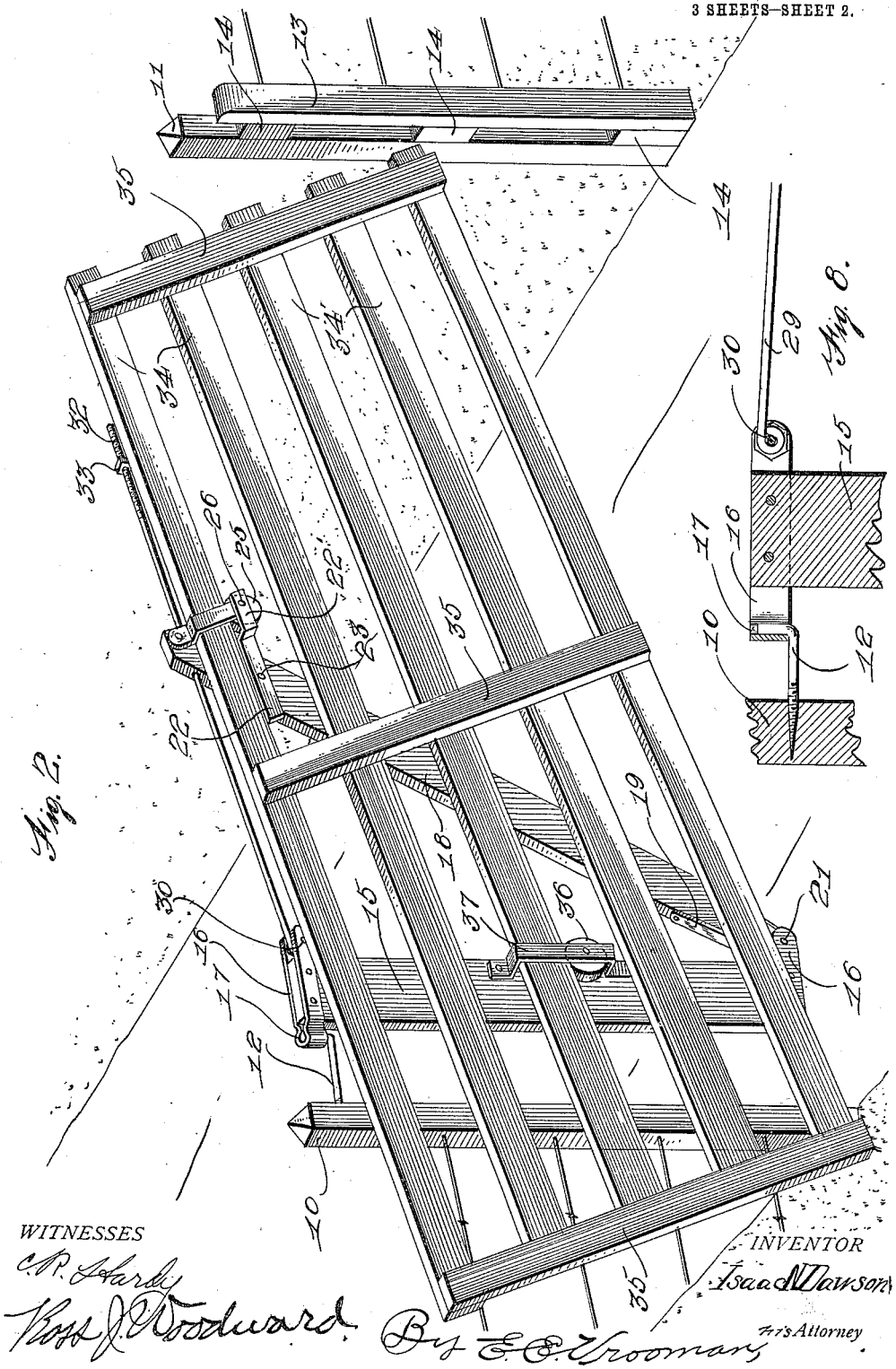

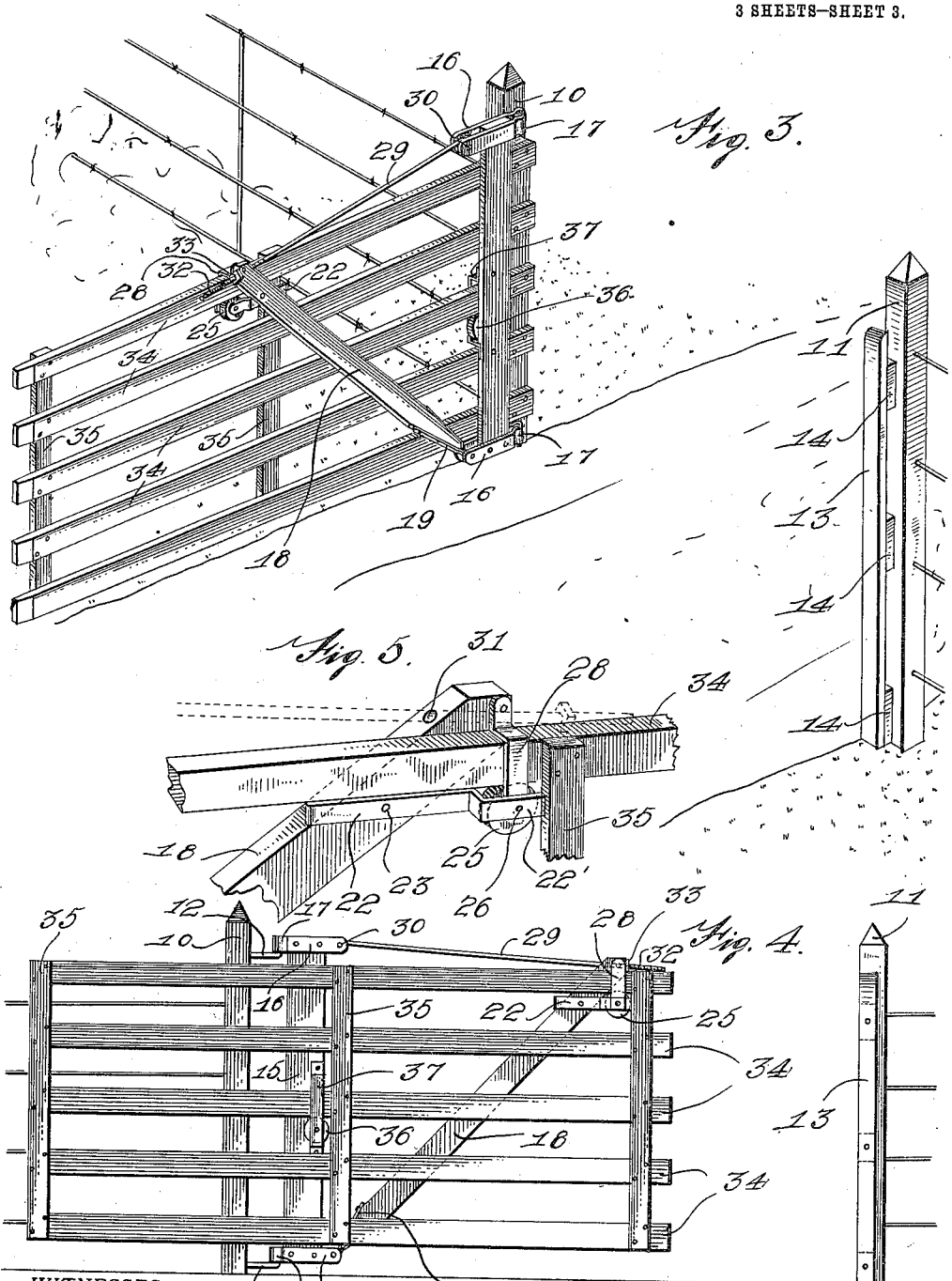

UNITED STATES PATENT OFFICE.

ISAAC N. DAWSON, OF PERU, INDIANA.

GATE.

1,092,901.  Specification of Letters Patent.  Patented Apr. 14, 1914.

Application filed February 1, 1913. Serial No. 745,750.

*To all whom it may concern:*

Be it known that I, ISAAC N. DAWSON, citizen of the United States, residing at Peru, in the county of Miami and State of Indiana, have invented certain new and useful Improvements in Gates, of which the following is a specification, reference being had therein to the accompanying drawing.

This invention relates to a gate of the type which is generally used upon farms, and the principal object of the invention is to provide a gate which may be easily opened and closed and which may be adjusted to permit small animals to pass out, while preventing larger animals from doing so.

Another object of the invention is to provide an improved means for permitting the gate to be longitudinally adjusted upon its support.

Another object of the invention is to so construct the support that the gate may be angularly adjusted as well as longitudinally adjusted.

With these and other objects in view this invention consists of certain novel combinations, constructions, and arrangements of parts as will be hereinafter fully described and claimed.

In the accompanying drawings:—Figure 1 is a perspective view showing the gate in a closed position. Fig. 2 is a perspective view showing the gate angularly adjusted to permit small animals such as hogs to pass beneath the gate. Fig. 3 is a perspective view showing the gate opened. Fig. 4 is a view in elevation showing the gate moved longitudinal to leave the gate partially open. Fig. 5 is a perspective view of the upper portion of the diagonal supporting bar for the gate. Fig. 6 is a perspective view of the bracket which carries the supporting roller at the upper end of the diagonal supporting bar. Fig. 7 is a fragmentary sectional view of the hinge at the lower end of the gate and the lower end portion of the diagonal supporting bar. Fig. 8 is a fragmentary sectional view showing the manner of pivotally mounting the upper end portion of the gate.

From an inspection of the drawings it will be readily seen that this gate is mounted between the end posts 10 and 11 which are placed upon opposite sides of the road. The gate is pivotally connected with the brackets 12 and is held in a closed position by having its longitudinally extending bars inserted between the post 11 and the vertically extending strip 13 which is held in spaced relation to the post 11 by the blocks 14.

The support for the gate includes the vertical standard 15 having its upper and lower end portions pivotally connected with the brackets 12 by the strap hinges 16. These strap hinges have their inner end portions 17 crimped as shown to form pockets through which the brackets pass and have their outer end portions extending beyond the standard 15 to form pivot ears. A diagonal supporting and bracing bar 18 is pivotally connected at its lower end with the lower strap hinge 16 by a strap hinge 19 which is crimped to form a housing 20 through which a pivot pin 21 passes. A bracket 22 is secured to the upper end portion of the bracing bar 18 by means of a bolt 23 passing through an opening 24 and has the free end portions 22' of its arms positioned in spaced relation to permit a roller 25 to be rotatably mounted between the arms of the bracket upon a pin 26 passing through the openings 27. This bracket 22 is preferably countersunk in the bracing bar 18 and is braced by a link 28. This link has its lower end portion mounted upon the pin 26 and has its upper end portion connected with the brace 18. This link not only serves as a brace for the bracket 22, but also serves as a guide for the gate which will be hereinafter described. The arms of the bracket 22 extend beyond the roller 25 and bracing link 28 and engage the vertical bar 35 of the gate as shown in Fig. 5, so that the bar 35 will be prevented from breaking the roller or wrenching the link loose.

A rod 29 has its inner end portion pivotally connected with a pin 30 carried by the hinge 16 and has its free end portion passing through an opening 31 in the upper end portion of the bracing bar 18. The free end portion of this rod 29 is threaded as shown at 32 to permit a nut 33 to be adjustably mounted upon the rod, thus permitting the pivotal movement of the bracing bar 18, to be regulated.

The gate which is carried by the support is constructed very similar to the ordinary type of farm gate and comprises the longitudinally extending bars 34 which are connected by the cross bars 35. The upper longitudinally extending bar passes between the bracing bar 18 and supporting link 28 and rests upon the roller 25. The middle rail of the gate rests upon a roller 36 carrier by the bracket 37 secured to the standard 15, and it will thus be seen that this gate is mounted upon rotatable supports, thus permitting the gate to be easily moved lontudinally. It should also be noted that the brackets 28 and 37 act as stops to limit the longitudinal movement of the gate by the cross bars 35 contacting with the brackets as shown in Fig. 4. When this gate is in the normal position and closed it will be in the position shown in Fig. 1. In case it is desired to permit small animals such as hogs to pass through the gate and at the same time prevent larger animals such as horses and cows from passing out the gate may be tilted as shown in Fig. 2. When this is done the free end of the gate is tilted upwardly, thus causing a binding engagement between the supporting bar 18 and the rod 29. If desired the free end of the gate may be supported by one of the longitudinally extending bars resting upon one of the spacing blocks 14, thus preventing any possibility of the weight of the gate causing the bar 18 to slip upon the rod 29 and permitting the gate to return to the position shown in Fig. 1. By adjusting the nut 33 the gate may be caused to slope downwardly from the post 10 to the post 11, thus preventing any danger of a large opening being left between the gate and a low spot in the road in the event of the road not being level. If it is desired to permit one animal to pass through the gate and to then close the gate in time to prevent others from passing out the gate may be moved longitudinal to the position shown in Fig. 4, thus leaving the gate partially open. After the desired animal has passed out through the gate the person caring for the gate may push the gate to the position shown in Fig. 1, thus preventing the remaining animals from passing out.

A gate has, therefore, been provided which may be operated in a number of different ways, and which may be adjusted to permit certain animals to leave the inclosure, while the remaining animals will be prevented from leaving. It will also be seen that the support for the gate not only permits the gate to be swung open in the ordinary manner, but also permits it to be open by longitudinal movement and to be angularly adjusted in a vertical direction.

Having thus described the invention what is claimed as new, is:—

A gate, a support for said gate, a horizontal bracket carried by said support, a vertical strap carried by the upper portion of said support and connected with said bracket, a roller carried by said bracket, the end of said bracket extending beyond said roller, said gate having one of its horizontal bars resting upon said roller and passing between said strap and brace, the free end of said bracket engaging one of the vertical bars of said gate to limit the movement of said gate in one direction and prevent the vertical bar of the gate from striking said roller.

In testimony whereof I hereunto affix my signature in presence of two witnesses.

ISAAC N. DAWSON.

Witnesses:
EDWARD HENNESSEY,
CHARLES M. PETTY.

---

Copies of this patent may be obtained for five cents each, by addressing the "Commissioner of Patents, Washington, D. C."